Jan. 21, 1941.  F. J. GUSTAFSON ET AL  2,229,378
CHRISTMAS TREE STAND WITH CORRUGATED CUP
Filed Feb. 20, 1939
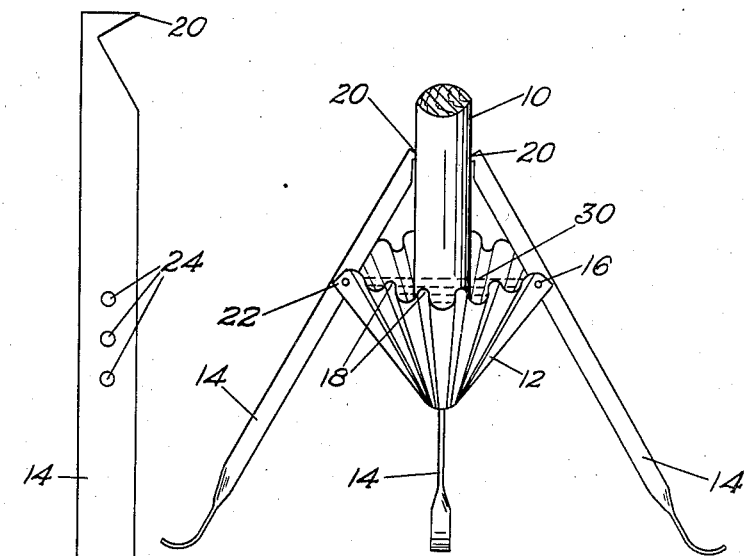
FIG. 1
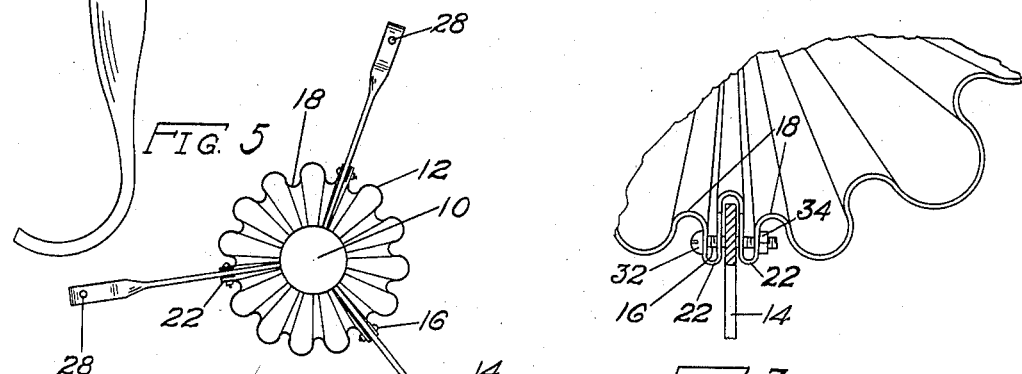
FIG. 5
FIG. 2
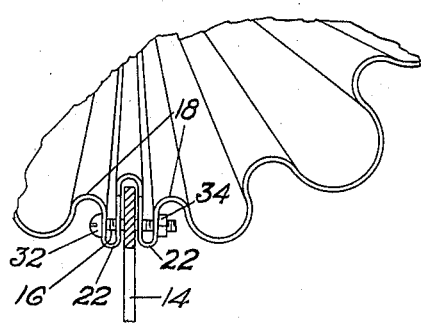
FIG. 3
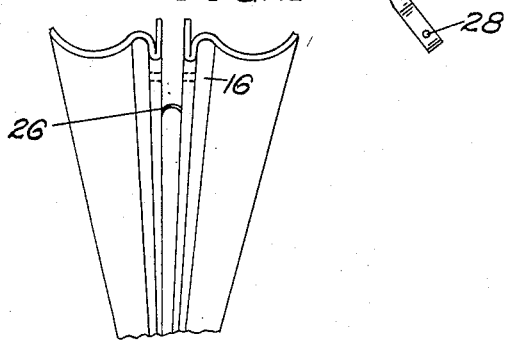
FIG. 4
FOLKE J. GUSTAFSON
HOLGER C. GUSTAFSON
INVENTORS
PER
ATTORNEY Patented Jan. 21, 1941

2,229,378

UNITED STATES PATENT OFFICE 2,229,378

CHRISTMAS TREE STAND WITH CORRUGATED CUP

Folke J. Gustafson and Holger C. Gustafson, Chicago, Ill.

Application February 20, 1939, Serial No. 257,274

4 Claims. (Cl. 248—47)

This invention relates to improvements in Christmas tree holders and more especially to improvements over our prior Patent Number 1,898,300 dated February 21, 1933, and has for one of its principal objects the provision of a corrugated inverted conical centerpiece used as the variably positioned fulcrum for the trunk clamping legs.

Another important object of this invention is to provide a stand which allows for a ready attachment to and proper support of trees of any ordinary size.

A further important object of this invention lies in the taking advantage of the fact that a heavier tree tends to increase the clamping effectiveness of the legs and the corrugations, thereby making it a desirable stand for any tree.

Another and further important object of this invention is the provision of a corrugated centerpiece which can be filled with water thereby keeping the tree fresh for a longer period of time.

Other and further important objects will be apparent from the accompanying drawing and following specification.

The invention, in a preferred form, is shown in the drawing and hereinafter more fully described.

In the drawing:

Figure 1 is a perspective view of the stand of this invention, showing the lower portion of a tree positioned therein.

Figure 2 is a top view of the stand as shown in Figure 1.

Figure 3 is a detail showing of one of the pivotal mountings for the legs on the conical centerpiece.

Figure 4 shows a detail side view of the centerpiece of the stand at the point where a leg is attached, the leg being removed to clarify the drawing.

Figure 5 shows a leg detached from the stand.

As shown in the drawing:

The reference numeral 10 indicates generally a Christmas tree positioned in the corrugated conical centerpiece 12, which is a fulcrum for the three legs 14, pivotally mounted at 16, on said centerpiece.

The corrugations 18 have a gripping effect on the tree heretofore unknown in any smooth conical centerpiece and provide a much more easily manufactured structure.

The legs 14 are equipped with integral spurs 20 to clamp the stem or trunk of the tree 10. As best shown in Figure 3, the folds of the corrugated centerpiece 12 come closer together at 22 to form a bearing for the legs 14. Each is finished with three holes in it as best shown in Figure 5 at 24 so that the position of the fulcrum centerpiece 12 can be raised or lowered at will.

Figure 4 shows how the corrugation is cut through to the point 26 to give the legs room for pivoting and also to form a limiting point to the degree of pivot swing of each leg.

When a tree is put in this stand, the corrugation folds 18 of the centerpiece 12 form grooves in the trunk of the tree, thereby gripping it thoroughly all around and tending to hold it in an upright position. As the weight of the tree comes down on the fulcrum 12, the spurs 20 of the legs 14 dig into the trunk of the tree. These gripping and clamping means assure the tree of a sturdy solid stand. If the tree is excessive in height and weight, however, it is possible to screw or nail the stand to the floor through the holes 28, eliminating any possibility of the tree falling or shifting its position.

The centerpiece 12 can be filled with water, as shown at 30, to keep the tree fresh.

The stand can be readily dismounted, being put together by machine screws and nuts 32 and 34 respectively, thereby facilitating storage in a minimum amount of space.

The corrugated conical container is quite simply manufactured out of a circular sheet of steel or iron by means of a suitable die or the like, and proper bearing supports for the legs can be incorporated into the structure during the process of stamping or forming without any additional trouble or effort, the only requirement being that the die be correspondingly shaped so as to produce a closer fold at the points 22 spaced at intervals of 120° around the circumference of the conical container.

We are aware that many changes may be made and numerous details of construction varied throughout a wide range without departing from the principles of this invention, and we, therefore, do not purpose limiting the patent granted hereon otherwise than as necessitated by the prior art.

We claim as our invention:

1. A Christmas tree stand, comprising a container for the lower end of a tree trunk and three supporting legs for the container, the legs being pivotally attached with a pin to the container, said container being composed of a single sheet of metal and formed into an inverted conical shaped cup with integral corrugations extending around the sides of the container, the corrugations being more pronounced at the periphery of the container and diminishing toward the center and apex, certain of the corrugations being more narrowly crimped than others to provide bearing supports for the leg pins.

2. A Christmas tree stand, comprising a container for the lower end of a tree trunk and three supporting legs for the container, the legs being pivotally attached with a pin to the container, said container being composed of a single sheet of metal and formed into an inverted conical shaped cup with integral corrugations extending around the sides of the container, the corrugations being more pronounced at the periphery of the container and diminishing toward the center and apex, certain of the corrugations being more narrowly crimped than others to provide bearing supports for the leg pins said pins being bolts passing through aligned openings in said narrowly crimped corrugations.

3. A Christmas tree stand, comprising a container for the lower end of a tree trunk and three supporting legs for the container, the legs being pivotally attached with a pin to the container, said container being composed of a single sheet of metal and formed into an inverted conical shaped cup with integral corrugations extending around the sides of the container, the corrugations being more pronounced at the periphery of the container and diminishing toward the center and apex, certain of the corrugations being more narrowly crimped than others to provide bearing supports for the leg pins said pins being bolts passing through aligned openings in said narrowly crimped corrugations, each leg comprising a flat strip of metal having a trunk engaging point at one end and a floor engaging face at the other end.

4. A Christmas tree stand, comprising a container for the lower end of a tree trunk and three supporting legs for the container, the legs being pivotally attached with a pin to the container, said container being composed of a single sheet of metal and formed into an inverted conical shaped cup with integral corrugations extending around the sides of the container, the corrugations being more pronounced at the periphery of the container and diminishing toward the center and apex, certain of the corrugations being more narrowly crimped than others to provide bearing supports for the leg pins said pins being bolts passing through aligned openings in said narrowly crimped corrugations, each leg comprising a flat strip of metal having a trunk engaging point at one end and a floor engaging face at the other end, said floor engaging face being twisted through 90° with respect to the remainder of the leg.

FOLKE J. GUSTAFSON.
HOLGER C. GUSTAFSON.